Jan. 14, 1958     L. S. GREENLAND     2,819,757

FUEL SUPPLY SYSTEMS FOR GAS TURBINE ENGINES

Filed March 8, 1955                           10 Sheets-Sheet 1

Jan. 14, 1958     L. S. GREENLAND     2,819,757
FUEL SUPPLY SYSTEMS FOR GAS TURBINE ENGINES
Filed March 8, 1955     10 Sheets-Sheet 4

Jan. 14, 1958 L. S. GREENLAND 2,819,757
FUEL SUPPLY SYSTEMS FOR GAS TURBINE ENGINES
Filed March 8, 1955 10 Sheets-Sheet 6

Jan. 14, 1958 L. S. GREENLAND 2,819,757
FUEL SUPPLY SYSTEMS FOR GAS TURBINE ENGINES
Filed March 8, 1955 10 Sheets-Sheet 9

United States Patent Office 2,819,757
Patented Jan. 14, 1958

2,819,757

FUEL SUPPLY SYSTEMS FOR GAS TURBINE ENGINES

Leonard Sidney Greenland, Compton, Wolverhampton, England, assignor to H. M. Hobson Limited, London, England, a company of Great Britain Application March 8, 1955, Serial No. 492,956

Claims priority, application Great Britain March 10, 1954

1 Claim. (Cl. 158—36.3)

This invention relates to apparatus for controlling the rotational speed of an aircraft gas turbine engine of the type comprising an engine-driven pump for supplying fuel to the engine, a metering valve for controlling the rate of flow of fuel to the engine, and a governor including speed and acceleration-responsive elements for actuating the metering valve so as to reduce the flow of fuel to the engine in response to increase in speed and positive acceleration of the engine and to increase the flow of fuel to the engine in response to decrease in speed and negative acceleration of the engine.

In order to keep the position of the metering valve nearly stationary for a given speed, irrespective of altitude changes, and thereby minimising the errors due to engine load changes the invention provides, in an apparatus of the above type, a second metering valve in series with the governor-controlled metering valve and actuated by a device responsive to ram pressure so as to decrease the rate of flow of fuel to the engine in response to decrease in ram pressure and increase the rate of flow of fuel to the engine in response to increase in ram pressure.

In speed control apparatus of the above type, the position of the metering valve is normally controlled by a servo piston, means being provided for permitting a restricted flow of liquid from one side of the servo piston to the other and for balancing the servo piston against the pressure difference across it and the rate of said restricted flow of liquid being determined by a servo valve controlled by the governor.

In U. S. specification No. 2,633,830 has been described a speed control apparatus of the above type with a servo-controlled metering valve in which the speed-responsive element of the governor is a centrifugal impeller and the two elements of the governor respectively supply fuel under pressure to speed- and acceleration-responsive diaphragms coupled to the servo valve, the speed-responsive diaphragm being associated with a spring, the loading of which can be adjusted to determine the speed at which the engine will run. The pressure developed across a centrifugal impeller, and therefore the speed at which the engine is controlled, depends however on the density of the fuel and one object of the present invention is to provide an alternative form of apparatus of the above type in which the controlled speed is independent of fuel density.

The invention accordingly includes a speed control apparatus of the above type with a servo-controlled metering valve in which the servo valve is loaded by a spring, the loading of which can be varied by the pilot to determine the speed at which the engine is to run, the speed-responsive element of the governor is an engine-driven mechanical centrifugal governor acting on the servo valve in opposition to the spring and the acceleration-responsive element of the governor is arranged to apply to the servo valve, also in opposition to the spring, a hydraulic pressure which increases and decreases from a datum value in response respectively to positive and negative accelerations of the engine.

One specific embodiment of the invention will now be described in detail, by way of example, with reference to the drawings, in which:

Like reference numerals indicate like parts throughout the figures.

Figure 1:
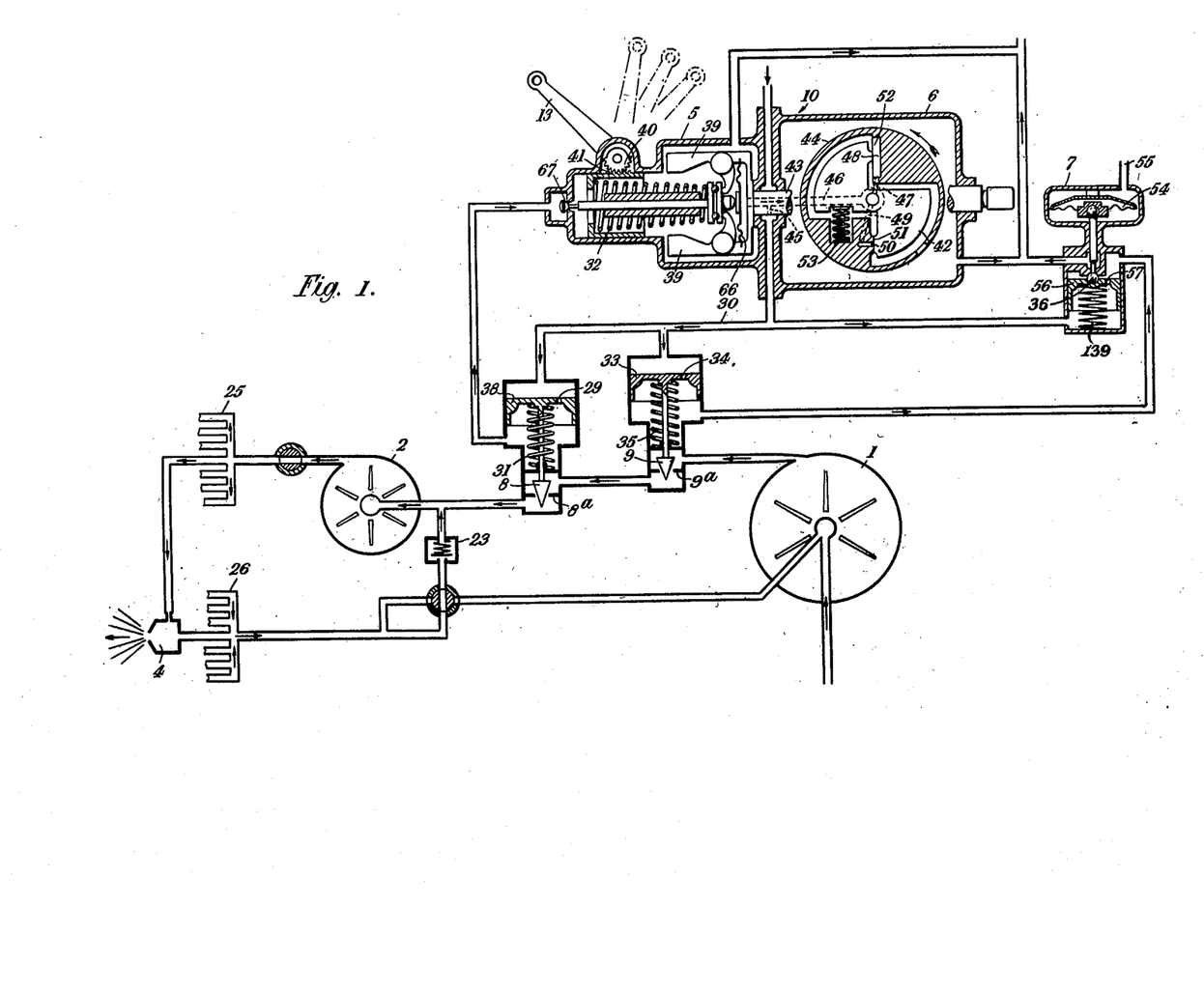
Fig. 1 shows diagrammatically a fuel supply system.

Fig. 1 shows diagrammatically a fuel supply system for a gas turbine aircraft, which is more fully described in our copending application Serial No. 493,927, filed March 14, 1955, and shows the system in the condition in which it operates when the pilot's control lever 13 is in a position on its quadrant between "flight idling" (a proportion of maximum speed) and "full power" (maximum speed).

Fuel from a tank, pressurised by the tank pump, is then supplied to the inlet of a main centrifugal pump 1, whence it is fed to the inlet of a secondary centrifugal pump 2 via speed and altitude valves 8 and 9. These are needle valves controlling plate type orifices 8a, 9a respectively.

The secondary pump 2 supplies fuel to the spill burners 4 via a delivery gallery 25, and fuel is returned to the inlet of the pump 2 from the spill gallery 26 through a non-return valve 23. The supply of fuel to the engine is determined by the speed fuel valve 8 acting as a throttle to the delivery of the main supply pump 1 which, over the operating range of the engine, will deliver or be capable of delivering more fuel than is actually required.

The position of the valve 8 is governed, as described later, by a speed control unit 10, comprising a speed sensitive element 5 and an acceleration sensitive element 6 which jointly control the position of a servo valve 67. The speed fuel valve 8 is attached to a piston 38 formed with a restricted orifice 29. A filtered supply of pressurised liquid is supplied, through a line 30, to the upper surface of the piston 38 as seen in the drawing, and liquid can flow from beneath the piston 38 to exhaust via the valve 67. A spring 31 balances the piston 38 against the pressure difference across it.

In order to keep the position of the speed valve 8 nearly stationary for a given speed, irrespective of altitude, thereby minimising the errors due to engine load changes, the altitude fuel valve 9 is included. This, as later described in detail, is under the control of the altitude and ram responsive control unit 7, and takes up a position determined by the unit 7 and acts in series with the speed valve 8 in throttling the delivery of the main pump 1.

The valve 9 is connected to a piston 33, formed with a restricted orifice 34, and subject at its upper surface to the pressure in the line 30. A spring 35 balances the piston 33 against the pressure difference across it. Liquid flows from the underside of the piston 33 to exhaust through the valve 36 of the unit 7, the position of the valve 9 thus being determined by the position of the valve 36.

Figure 2:
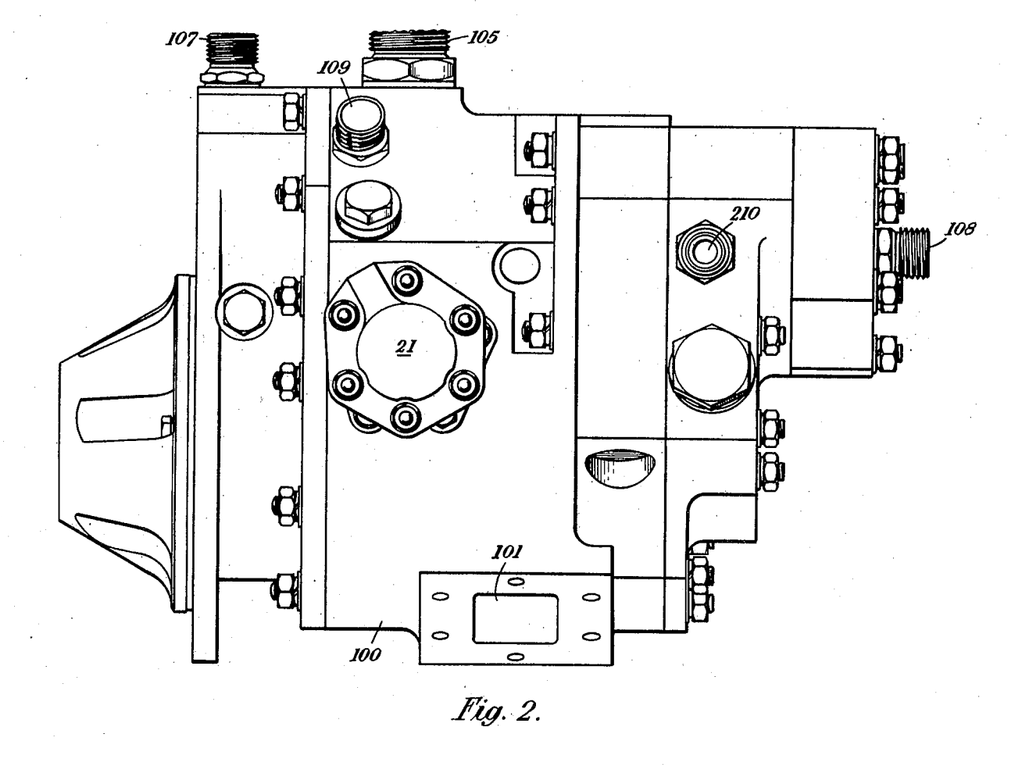
Fig. 2 is a side elevation of the housing containing the two centrifugal impellers and the speed and altitude valves.
Figure 3:
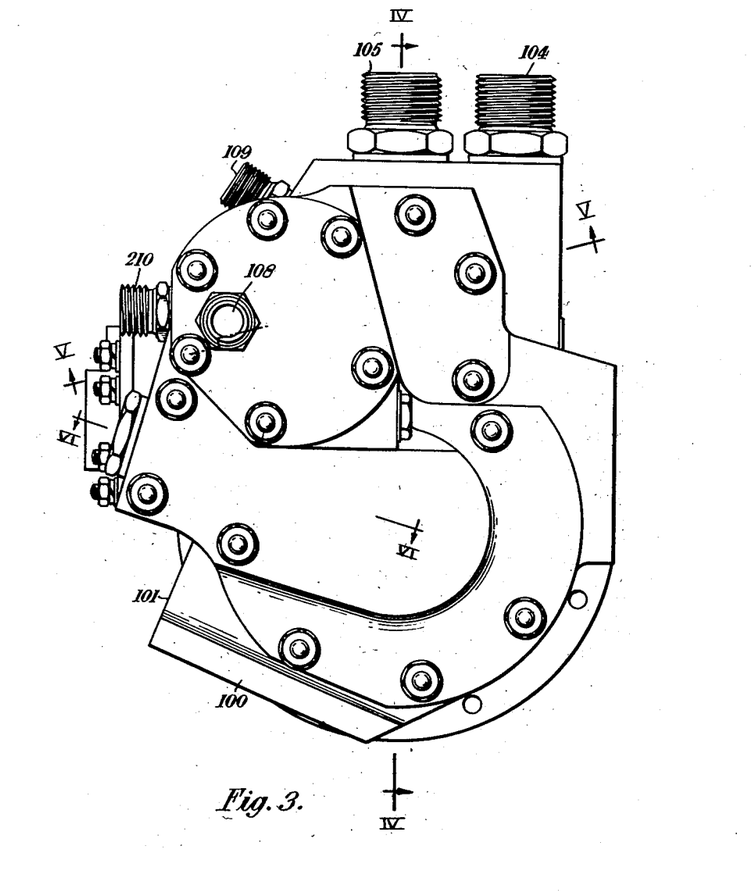
Fig. 3 is a view looking from the right hand end of Fig. 2, Figs. 4, 5 and 6 are respectively sections on the lines IV—IV, V—V and VI—VI in Fig. 3, Figs. 7 and 8 are respectively sections on the lines VII—VII and VIII—VIII in Fig. 4.
Figure 4:
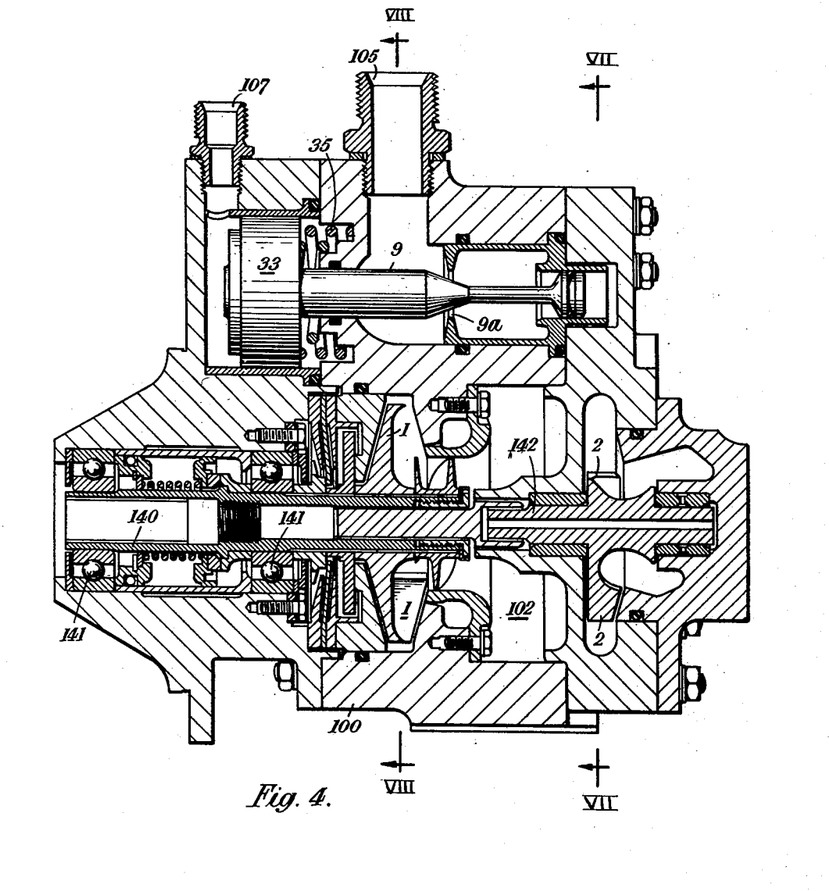
Figure 5:
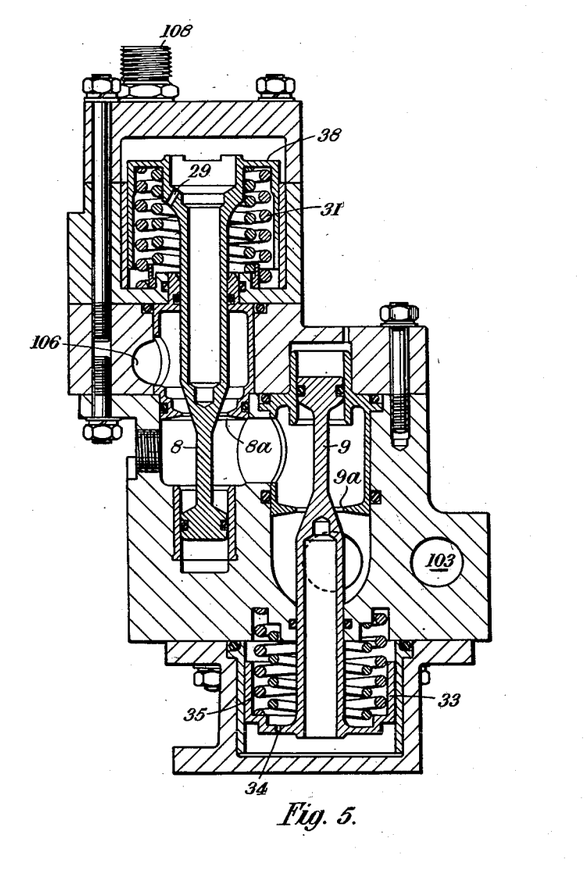
Figure 8:
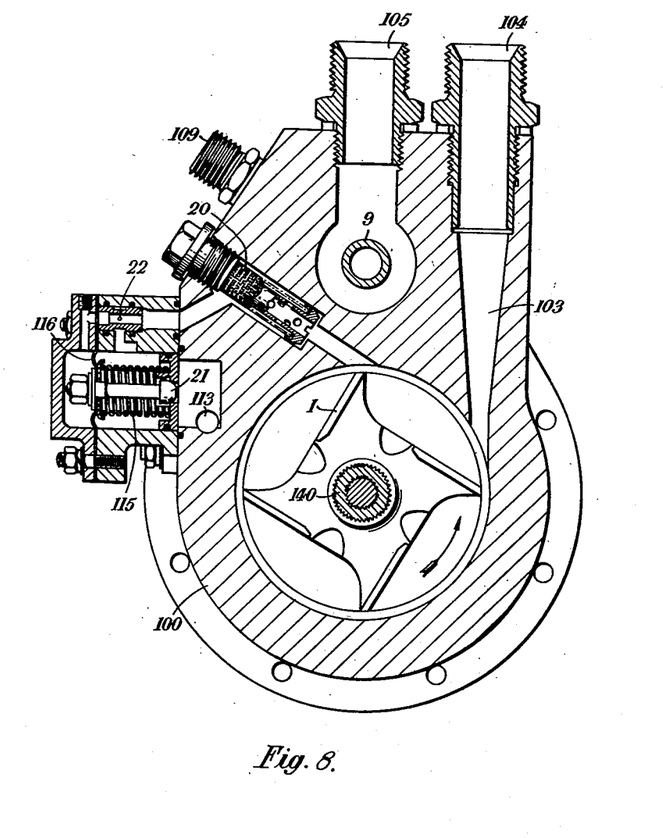

The centrifugal pumps 1, 2, the speed valve 8 and the altitude valve 9 are all contained in a common housing 100 (Fig. 2) having a fuel inlet 101, from which fuel passes via a space 102 (Fig. 4) to the eye of the main centrifugal pump 1. The pump 1 pumps the fuel along a duct 103 (Fig. 8) to an outlet 104 whence the fuel passes through an external cooler (not shown) to an inlet 105. Fuel entering the inlet 105 passes through the altitude valve 9, as shown in Figs. 4 and 5, and then through the speed valve 8 to a port 106 (Fig. 5). Pressurised liquid from the line 30 (Fig. 1) is admitted to the high pressure side of the piston 33 through an inlet 107 (Fig. 4) and to a high pressure side of the piston 38 through an inlet 108 (Fig. 5). Liquid flowing through the restricted orifice 34 in the piston 33 escapes from the housing through an outlet 109 (Fig. 3) and liquid flowing through the restricted orifice 29 in the piston 38 escapes from the housing through an outlet 210 (Fig. 3).

Figure 6:
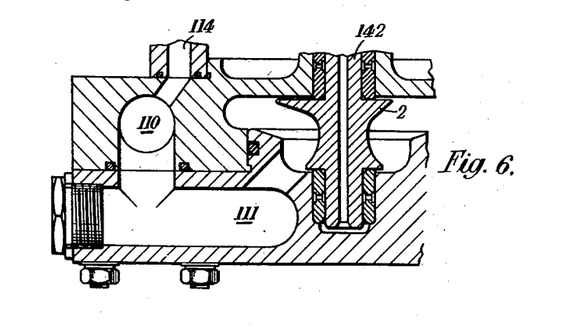
Figure 7:
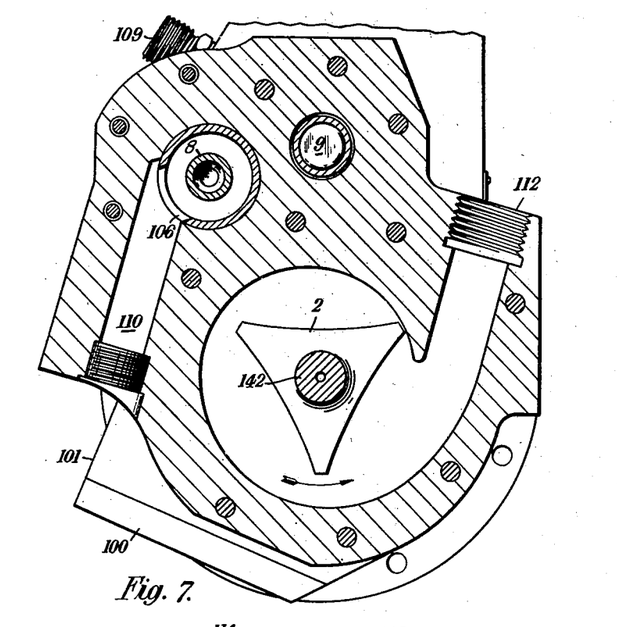

The fuel flows from the port 106 (Fig. 5) into passages 110, 111 (Figs. 6 and 7) and thence to the eye of the centrifugal pump 2, which delivers the fuel from the housing through an outlet 112. Part of the fuel supplied by the main centrifugal pump 1 by-passes the speed and altitude valves 9, 8 on its way to the centrifugal pump 2, being fed through a filter 20 (Fig. 8), a calibrated jet 22 and a minimum flow valve 21 to a hole 113 communicating, via a passage 114 (Fig. 6) with the passage 111 leading to the inlet of the centrifugal pump 2. The minimum flow valve 21 (Fig. 8) which is urged towards the open position by a spring 115 and towards the closed position by the fuel pressure acting on a diaphragm 116, is set to maintain in this branch line a sufficient flow of fuel to ensure that flame extinction cannot occur at the burners in the event of rapid closure of the speed valve 8. As will be seen from Fig. 4, the centrifugal pump 1 is mounted on a drive shaft 140, supported in bearings 141 and fixed to the drive shaft 142 of the centrifugal pump 2.

It will be appreciated that the position of the speed valve 8 is determined by the rate of flow of liquid through the orifice 29 in the piston 38 and out of the housing through the outlet 210 and that this, in turn, is determined by the position of the valve 67.

Figure 9:
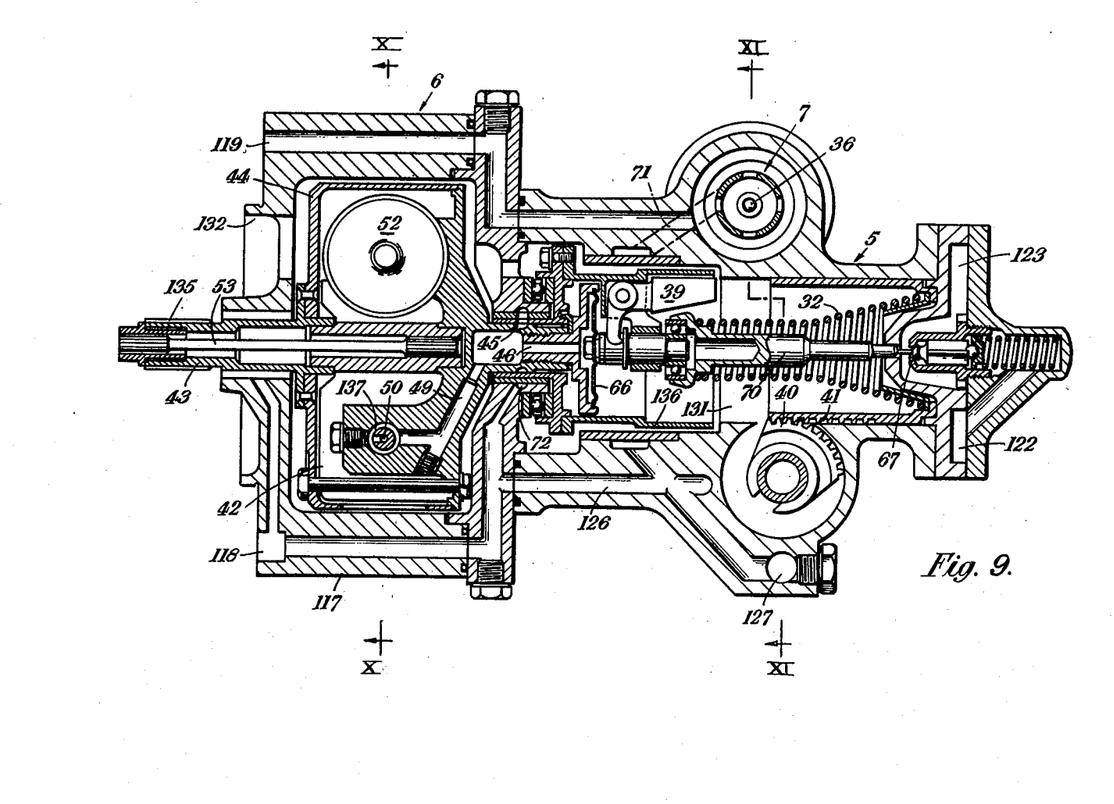
Fig. 9 is a longitudinal section through the speed control unit.

As illustrated diagrammatically in Fig. 1, and in detail in Fig. 9, the servo valve 67 is urged towards the closed position by a spring 32 and towards the open position by the bob-weights 39 of a centrifugal governor driven by the engine. The pilot's control lever 13 operates, through a servo mechanism, a gear segment 40 meshing with rack teeth on an abutment 41 for the spring 32. Movement of the control lever 13 accordingly serves to vary the loading of the spring 32 and therefore the speed which will be maintained by the speed sensitive element of the governor. When the control lever 13 is moved to select a lower speed, it reduces the load on the spring 32, so allowing the valve 67 to open and the valve 8 to move to reduce the fuel flow. The valve 67 returns to its control position when the engine speed has decreased to the newly selected value. Similarly, on movement of the control lever 13 to select a higher speed, the valve 67 is closed, so allowing the valve 8 to move to increase the fuel flow.

Figure 12:
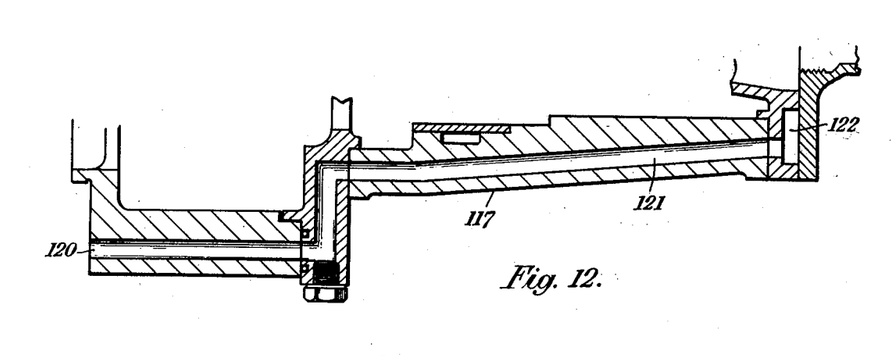
Figure 13:
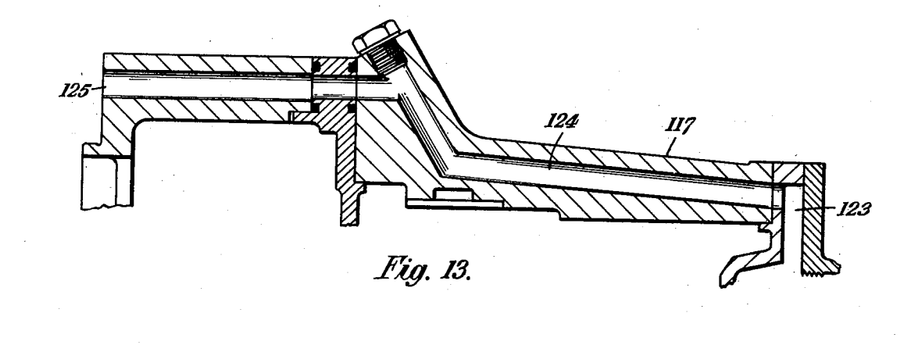

The speed control unit is mounted in a housing 117 (Fig. 9) having at its left hand end an inlet 118 for pressurized liquid from the high pressure supply line 30 and an inlet 119 for liquid flowing through the restriction 34 in the piston 33 of the altitude valve 9 and thence, through the outlet 109 (Fig. 3) from the casing 100 of the speed and altitude valves. The casing 117 has another inlet 120 (Fig. 12) for liquid flowing through the restriction 29 in the piston 38 of the speed valve 8 and thence through the outlet 210 from the casing 100 (Fig. 3). The liquid entering the inlet 120 (Fig. 12) flows through a passage 121 to a duct 122 and thence, through the valve 67, to a space 123 communicating, via a passage 124 (Fig. 13) with an exhaust outlet 125.

The high pressure liquid entering the inlet 118 (Fig. 9) flows through a passage 126 to a duct 127 (Fig. 11) communicating with the inlet port 128 of a vane type servomotor. The exhaust port 129 of the servomotor communicates, via a passage 130, with the hollow interior 131 of the housing 117 which, in turn, communicates with an exhaust outlet 132 (Fig. 9). The pilot's lever 13 (Fig. 1) is effective to rotate the stem 133 of the control valve 133A (Fig. 11) of the servomotor and thereby to cause the vane 134, which is fixed to a sleeve 134A surrounding the valve 133A, to rotate in known manner in a direction and to an extent determined by the direction and extent of the movement of the pilot's lever. The vane servomotor is shown only diagrammatically in Fig. 11 but it may be explained that it is of the type disclosed in U. S. Patent No. 2,398,586, the valve 133A having two pairs of axially extending grooves separated by lands, one pair of opposite grooves communicating with the inlet port 128 and the other pair of grooves communicating with the outlet port 129, and the sleeve 134A having ports disposed on opposite sides of the vane 134 and normally masked by the lands of the valve, the arrangement being such that on rotation of the valve one side of the vane will be subject to pressure and the other connected to exhaust, so causing the vane to rotate until the ports in the sleeve are again masked by the lands of the valve. The gear segment 40 is attached to a shaft 143 fixed, by a coupling 143A, to the sleeve 134A of the vane 134 and accordingly adjusts the abutment 41, and therefore the loading of the spring 32, to a value determined by the position of the pilot's lever. The shaft 143 attached to the vane serves, as described in U. S. application Serial No. 493,927, filed March 14, 1955, to adjust the position of a cam shaft for adjusting certain cocks in the fuel supply system to conform with the position of the pilot's lever.

The speed control unit includes a shaft 43 (Fig. 9), having at its end splines 135 by which it is rotated. Fixed to the shaft 43 is the casing 44 of the acceleration sensitive element 6 of the unit and a casing 136 carrying the bob-weights of the speed sensitive unit. Within the casing 44 is a flywheel 42, which is fixed to one end of a torsion bar 53 (illustrated as a spring 53 in Fig. 1). The other end of the torsion bar is fixed to the shaft 43.

The high pressure liquid entering the inlet 118 flows, via an annulus 72 and a restricted orifice 45, into a duct 46 in the interior of the shaft 43. This duct communicates with the face of a diaphragm 66, which bears against the spindle 70 of the valve 67, and also, via a passage 47 (Fig. 10), with a cavity 48 in the casing 44, and, via a passage 49 (Fig. 9), with an annulus 137 (Fig. 10) communicating with an outlet orifice 50 controlled by a face valve 51 on the flywheel 42. The cavity 48 is sealed by a low rate diaphragm 52 and the torsion bar 53, normally maintains the flywheel 42 in a position such that it applies pressure, through a lever 138 pivoted to the casing 44, to the diaphragm 52 to maintain in the cavity 48 a datum hydraulic pressure, determined by the loading of the torsion bar 53 in combination with the face valve 51, which allows liquid to flow from the passage 49 to the interior of the casing 44 and thence to exhaust. The acceleration sensitive element of the speed control unit is more fully described in U. S. Patent No. 2,633,830. Said diaphragm 52 operates to translate hydraulic pressure into force to move the flywheel 42.

Figure 10:
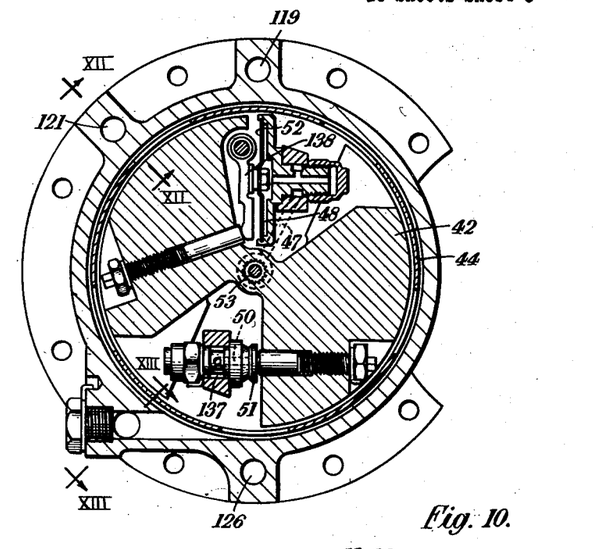
Figs. 10 and 11 are respectively sections on the lines X—X and XI—XI in Fig. 9, and Figs. 12 and 13 are respectively sections on the lines XII—XII and XIII—XIII in Fig. 10.

The casing 44 rotates anticlockwise as seen in Fig. 10, and positive acceleration of the engine will accordingly cause the face valve 51 to close, thereby increasing the hydraulic pressure in the passage 49 and the duct 46 and so increasing the hydraulic pressure acting on the diaphragm 66 above the datum value normally maintained by the diaphragm 52, while the reverse will occur in the event of negative acceleration. The diaphragm 66 thus operates during periods of acceleration to impose on the valve 67 a hydraulic component of force additional to the mechanical force exerted on said valve by the bobweights 39 and to cause the valve 67 to move and adjust the piston 38 and valve 8 so as to reduce the fuel flow in response to positive acceleration and increase it in response to negative acceleration of the engine.

Figure 11:
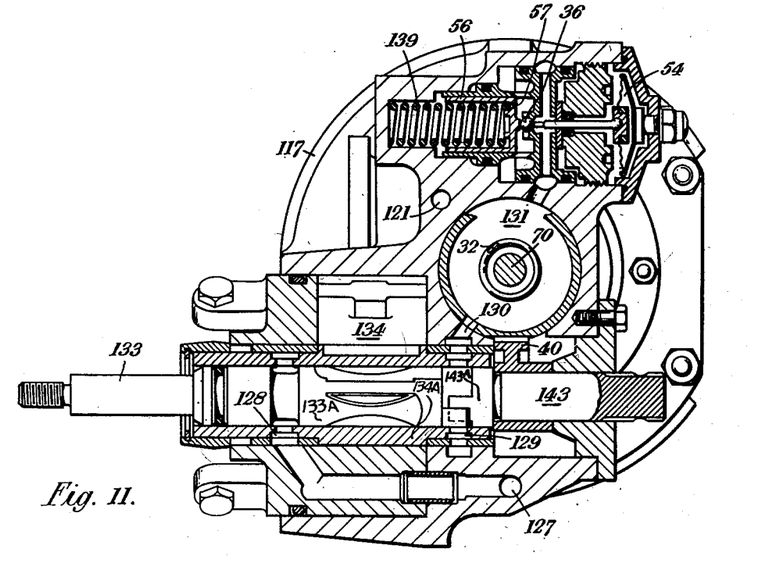

It has previously been explained that the position of the altitude valve 9 is determined by the position of the valve 36 of the altitude and ram responsive control unit 7 (Fig. 1). This unit is also contained in the casing 117 and is shown in Figs. 9 and 11.

The unit 7 includes an evacuated capsule 54 subject to ram pressure, applied to the unit through an inlet 55 (Fig. 1), and a piston 56 (Fig. 11) formed with a restricted orifice 57 and subject at one side, via a passage 71 (Fig. 9), to the pressure at the inlet 118 and at its other side to the pressure at the inlet 119. The restriction 57 and the control valve 36 in series act conjointly to vary the hydraulic pressure at the low pressure side of the piston 56. The precise position of the control valve 36 is determined by the balance of forces acting on it, namely that from the capsule 54 in one direction and that from the piston 56, assisted by a spring 139, in the other. The capsule 54, which is so constructed as to possess a very low rate over the working travel of the control valve 36, tends to expand beyond its normal length unless acted on by a restraining force, and this restraining force is supplied by the surrounding total pressure and the force applied by the piston 56. Any reduction in total pressure must therefore be accompanied by an increase in the pressure applied by the piston 56 before equilibrium can be restored, and this is provided by reason of the valve 36 opening to reduce the hydraulic pressure at the low pressure side of the piston 56. Consequently, as the aircraft loses speed and/or gains altitude, the capsule 54 expands and causes a reduction in hydraulic pressure at the low pressure side of the piston 56 and consequently also a reduction of the hydraulic pressure at the low pressure side of the piston 33. This causes the piston 33 to move the valve 9 downwards to reduce the fuel flow to the engine. Similarly, when the ram pressure increases the capsule 54 contracts and causes the valve 36 and piston 56 to move in the direction to increase the hydraulic pressure at the low pressure side of the piston 33, so causing the piston 33 to move the valve 9 upwards to increase the fuel flow to the engine. The position of the valve 9 accordingly depends on the ram pressure applied to the unit 7.

What I claim as my invention and desire to secure by Letters Patent is:

In combination with an aircraft gas turbine engine, an engine driven fuel pump for supplying fuel to the engine, a metering valve for controlling the supply of fuel to the engine, a first servo piston means for pressurising said first servo piston, means connecting said first servo piston to said metering valve to move said metering valve to increase the fuel supply in response to increase in the pressure acting on the low pressure side of said first servo piston and to move said metering valve in the reverse direction in response to decrease in said pressure, means permitting of restricted flow of liquid from one side to the other of said servo piston and for balancing said servo piston against the hydraulic pressure across it, a servo valve for controlling the flow of liquid from the low pressure side of said first servo piston, a device responsive to ram pressure exerting a force on said servo valve in one direction, a second servo piston exerting an opposing force on said servo valve, means for subjecting one side of said second servo piston to high pressure and the other side thereof to the pressure at the low pressure side of the first servo piston, means providing a restricted flow of liquid from one side of the second servo piston to the other, and means connecting said servo valve to said device responsive to ram pressure for moving said servo valve to decrease the pressure at the low pressure side of said first servo piston in response to decrease in ram pressure and to increase said pressure in response to increase in ram pressure.

References Cited in the file of this patent

UNITED STATES PATENTS

| | | |
|---|---|---|
| 2,358,894 | Volet | Sept. 26, 1944 |
| 2,472,181 | Werth, Jr. | June 7, 1949 |
| 2,583,006 | Niesemann | Jan. 22, 1952 |
| 2,636,553 | Ballantyne et al. | Apr. 28, 1953 |
| 2,643,513 | Lee, II | June 30, 1953 |
| 2,644,513 | Mock | July 7, 1953 |